United States Patent
Uttaro et al.

(10) Patent No.: US 10,979,341 B2
(45) Date of Patent: *Apr. 13, 2021

(54) MANAGEMENT OF FORWARDING TABLES AT EDGE ROUTERS

(71) Applicant: AT&T Intellectual Property I, L.P., Atlanta, GA (US)

(72) Inventors: James Uttaro, Staten Island, NY (US); Han Q. Nguyen, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,964

(22) Filed: Apr. 27, 2020

(65) Prior Publication Data
US 2020/0259735 A1 Aug. 13, 2020

Related U.S. Application Data

(63) Continuation of application No. 14/863,516, filed on Sep. 24, 2015, now Pat. No. 10,637,765.

(51) Int. Cl.
| | |
|---|---|
| *H04L 29/06* | (2006.01) |
| *H04L 12/741* | (2013.01) |
| *H04L 12/755* | (2013.01) |
| *H04L 12/733* | (2013.01) |

(52) U.S. Cl.
CPC .......... *H04L 45/021* (2013.01); *H04L 45/122* (2013.01); *H04L 45/745* (2013.01); *H04L 65/4076* (2013.01)

(58) Field of Classification Search
CPC ....................................................... H04L 45/20
USPC ........................................................ 370/392
See application file for complete search history.

(56) References Cited

U.S. PATENT DOCUMENTS

| | | | |
|---|---|---|---|
| 6,212,199 B1 | 4/2001 | Oxford | |
| 7,525,949 B1 | 4/2009 | Rampal et al. | |
| 8,848,714 B2 | 9/2014 | Yazaki et al. | |
| 9,178,807 B1 | 11/2015 | Chua | |
| 9,762,537 B1 | 9/2017 | Eyada | |
| 2007/0248091 A1 | 10/2007 | Khalid et al. | |

(Continued)

OTHER PUBLICATIONS

Jyothi et al., "Towards a Flexible Data Center Fabric with Source Routing," SOSR 2015, Jun. 17-18, 2015, ACM.

(Continued)

*Primary Examiner* — Angel T Brockman
(74) *Attorney, Agent, or Firm* — Hartman & Citrin LLC

(57) ABSTRACT

Concepts and technologies are disclosed herein for management of forwarding tables at edge routers. A processor that executes a software defined networking controller can select an edge router associated with a networking environment. The edge router can access or use a forwarding table. The processor can obtain routing information associated with the edge router. The routing information can include forwarding table contents associated with the forwarding table and next hop information that can indicate communication paths associated with the edge router. The processor can analyze the routing information to determine next hops associated with the edge router, generate a next hop graph that represents the next hops, and initiate updating of the forwarding table such that the forwarding table only includes data that corresponds to the next hops.

20 Claims, 6 Drawing Sheets

(56) References Cited

U.S. PATENT DOCUMENTS

| | | |
|---|---|---|
| 2010/0061272 A1 | 3/2010 | Veillette |
| 2010/0303081 A1 | 12/2010 | Miyabe |
| 2011/0274111 A1 | 11/2011 | Narasappa et al. |
| 2014/0247727 A1 | 9/2014 | Schick et al. |
| 2014/0355416 A1 | 12/2014 | Keesara et al. |
| 2015/0009806 A1 | 1/2015 | Bashandy et al. |
| 2015/0109902 A1 | 4/2015 | Kumar |
| 2017/0093686 A1* | 3/2017 | Uttaro .................. H04L 45/745 |

OTHER PUBLICATIONS

Liu et al., "Efficient FIB Caching using Minimal Non-overlapping Prefixes," ACM SIGCOMM Computer Communication Review, Jan. 2013, pp. 15-21, vol. 43, No. 1.
Xiong et al., "Control Architecture in Optical Burst-Switched WDM Networks," IEEE Journal on Selected Areas in Communications, Oct. 2000, pp. 1838-1851, vol. 18, No. 10.
U.S. Office Action dated Oct. 3, 2017 in U.S. Appl. No. 14/863,516.
U.S. Office Action dated Jun. 27, 2018 in U.S. Appl. No. 14/863,516.
U.S. Office Action dated Jan. 31, 2019 in U.S. Appl. No. 14/863,516.
U.S. Office Action dated Jun. 11, 2019 in U.S. Appl. No. 14/863,516.
U.S. Notice of Allowance dated Dec. 18, 2019 in U.S. Appl. No. 14/863,516.

* cited by examiner

MANAGEMENT OF FORWARDING TABLES AT EDGE ROUTERS

CROSS-REFERENCE TO RELATED APPLICATIONS

This application is a continuation of and claims priority to U.S. patent application Ser. No. 14/863,516, entitled "Management of Forwarding Tables at Edge Routers," filed Sep. 24, 2015, now U.S. Pat. No. 10,637,765, which is incorporated herein by reference in its entirety.

BACKGROUND

In some networks, servers, routers, or other devices may maintain routing tables or forwarding tables for routing packets or signals to other devices on the network. These tables can define next hops for various destinations. When a packet or other data is to be routed to a particular destination, the device can identify the next hop information and send the packet or other data to the next hop for routing to the eventual destination. To enable this ability to lookup next hop information, all possible next hops for a particular device are installed in the routing table or forwarding table even if no traffic will ever be sent to or via the next hops by a particular device.

Because the complexity and size of modern networks continues to increase, a growing amount of resources on a network may be used to store and/or use these routing tables or forwarding tables. As the networks continue to grow in size and complexity, the sizes of these tables and the resources dedicated to supporting creation, storage, and use of these tables will likely continue to increase. Usage and storage of these tables can consume valuable compute and storage resources that otherwise could be used for other purposes. Thus, performance of networks may be degraded and costs of providing networking services may increase based on the storage and/or use of routing tables or forwarding tables.

SUMMARY

The present disclosure is directed to management of forwarding tables at edge routers. An SDN controller and/or other functionality can be executed or hosted by a server computer. The server computer that executes the SDN controller can interact with one or more devices within a networking environment. In some embodiments, the server computer can be a part of the networking environment, though this is not necessarily the case. The server computer can receive or otherwise obtain routing information from one or more edge routers and/or from other devices associated with the networking environment that can include and/or be associated with the edge routers. The routing information can include forwarding table contents for one or more forwarding tables associated with one or more of the edge routers. The routing information also can include next hop information for the edge routers. The next hop information can define devices or entities with which the edge routers communicate directly (e.g., next hops for those edge routers).

The server computer can analyze the routing information to determine the next hops for a particular edge router and to generate a next hop graph that can represent the next hops for that edge router. In some embodiments, the server computer can provide the next hop graph to the edge router and/or the networking environment for providing to the edge router. The edge router can update the forwarding table associated with the edge router based on the next hop graph. In some other embodiments, the server computer can directly update the forwarding table associated with the edge router via commands and/or via direct control of the edge router or direct access to the forwarding table. In yet other embodiments, the server computer can broadcast the next hop graph or commands to one or more of the edge routers, and the edge routers can update the forwarding tables associated with the edge routers. Thus, the server computer can update the forwarding tables associated with one, more than one, and/or all edge routers associated with a networking environment. As such, it should be understood that that the analysis and next hop graph generation operations can be repeated for more than one and/or all edge routers in a networking environment.

In some embodiments, updating the forwarding tables as illustrated and described herein can improve performance of the edge routers. For example, updating the forwarding tables can result in decreased latency at the edge routers by shortening the amount of time needed to identify a next hop. Updating the forwarding tables also can reduce the costs of operating the edge routers by reducing, for example, an amount of processing power and/or storage capacity needed to store and/or use the forwarding tables. Thus, the capacities of edge routers can be reduced and/or the need to add new or redundant resources may be reduced by decreasing resource consumption of the edge routers and/or forwarding tables. Because the updating of the forwarding tables can result in other improvements, it should be understood that these examples are illustrative and therefore should not be construed as being limiting in any way.

According to one aspect of the concepts and technologies disclosed herein, a method is disclosed. A processor can execute a software defined networking controller. The processor can select an edge router associated with a networking environment. The edge router can access and/or use a forwarding table. The processor can obtain routing information associated with the edge router. The routing information can include forwarding table contents associated with the forwarding table and next hop information that indicates communication paths associated with the edge router. The processor can analyze the routing information to determine next hops associated with the edge router, to generate a next hop graph that represents the next hops, and to initiate updating of the forwarding table such that the forwarding table only includes data corresponding to the next hops determined by the processor.

In some embodiments, initiating the updating of the forwarding table can include providing the next hop graph to the edge router. In some embodiments, initiating the updating of the forwarding table can include updating the forwarding table by generating a command that, when received by the edge router, causes the edge router to update the forwarding table. In some embodiments, obtaining the routing information can include receiving, via a broadcast message, the routing information. The routing information can be generated by the edge router. In some embodiments, obtaining the routing information can include receiving, as a broadcast group delay message, the routing information. The broadcast group delay message can be generated by the edge router.

In some embodiments, initiating the updating of the forwarding table can include broadcasting a command that, when received by the edge router, causes the edge router to update the forwarding table. During updating of the forwarding table, the edge router can remove data that does not correspond to the next hops. In some embodiments, initiating updating of the forwarding table can include instructing the edge router to delete unused first hops from the forwarding table. In some embodiments, obtaining the routing information can include sending an interrogation message to the edge router. The interrogation message can request the routing information associated with the edge router. In response to the interrogation message, the routing information can be received. In some embodiments, obtaining the routing information can include receiving the routing information from a reachability server associated with the networking environment.

According to another aspect of the concepts and technologies disclosed herein, a system is disclosed. The system can include a processor and a memory. The memory can store computer-executable instructions that, when executed by the processor, cause the processor to perform operations. The operations can include selecting an edge router associated with a networking environment. The edge router can access and/or use a forwarding table. The operations also can include obtaining routing information associated with the edge router. The routing information can include forwarding table contents associated with the forwarding table and next hop information that indicates communication paths associated with the edge router. The operations also can include analyzing the routing information to determine next hops associated with the edge router, generating a next hop graph that represents the next hops, and initiating updating of the forwarding table. By updating the forwarding table, the forwarding table can include only data corresponding to the next hops.

In some embodiments, initiating the updating of the forwarding table can include providing the next hop graph to the edge router. In some embodiments, initiating the updating of the forwarding table can include generating a command that, when received by the edge router, causes the edge router to update the forwarding table. In some embodiments, obtaining the routing information can include receiving, as a broadcast group delay message, the routing information. The broadcast group delay message can be generated by the edge router. In some embodiments, initiating the updating of the forwarding table can include broadcasting a command that, when received by the edge router, causes the edge router to update the forwarding table to remove data that does not correspond to the next hops. In some embodiments, obtaining the routing information can include sending an interrogation message to the edge router. The interrogation message can request the routing information associated with the edge router, and in response to the interrogation message, the routing information can be received.

According to yet another aspect, a computer storage medium is disclosed. The computer storage medium can have computer-executable instructions stored thereon that, when executed by a processor, cause the processor to perform operations. The operations can include selecting an edge router associated with a networking environment. The edge router can access and/or use a forwarding table. The operations also can include obtaining routing information associated with the edge router. The routing information can include forwarding table contents associated with the forwarding table and next hop information that indicates communication paths associated with the edge router. The operations also can include analyzing the routing information to determine next hops associated with the edge router, generating a next hop graph that represents the next hops, and initiating updating of the forwarding table. By updating the forwarding table, the forwarding table can include only data corresponding to the next hops.

In some embodiments, initiating the updating of the forwarding table can include providing the next hop graph to the edge router. In some embodiments, initiating the updating of the forwarding table can include generating a command that, when received by the edge router, causes the edge router to update the forwarding table. In some embodiments, obtaining the routing information can include receiving, as a broadcast group delay message, the routing information, where the broadcast group delay message can be generated by the edge router, and where initiating the updating of the forwarding table can include broadcasting a command that, when received by the edge router, causes the edge router to update the forwarding table to remove data that does not correspond to the next hops. In some embodiments, obtaining the routing information can include sending an interrogation message to the edge router. The interrogation message can request the routing information associated with the edge router, and in response to the interrogation message, the routing information can be received.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
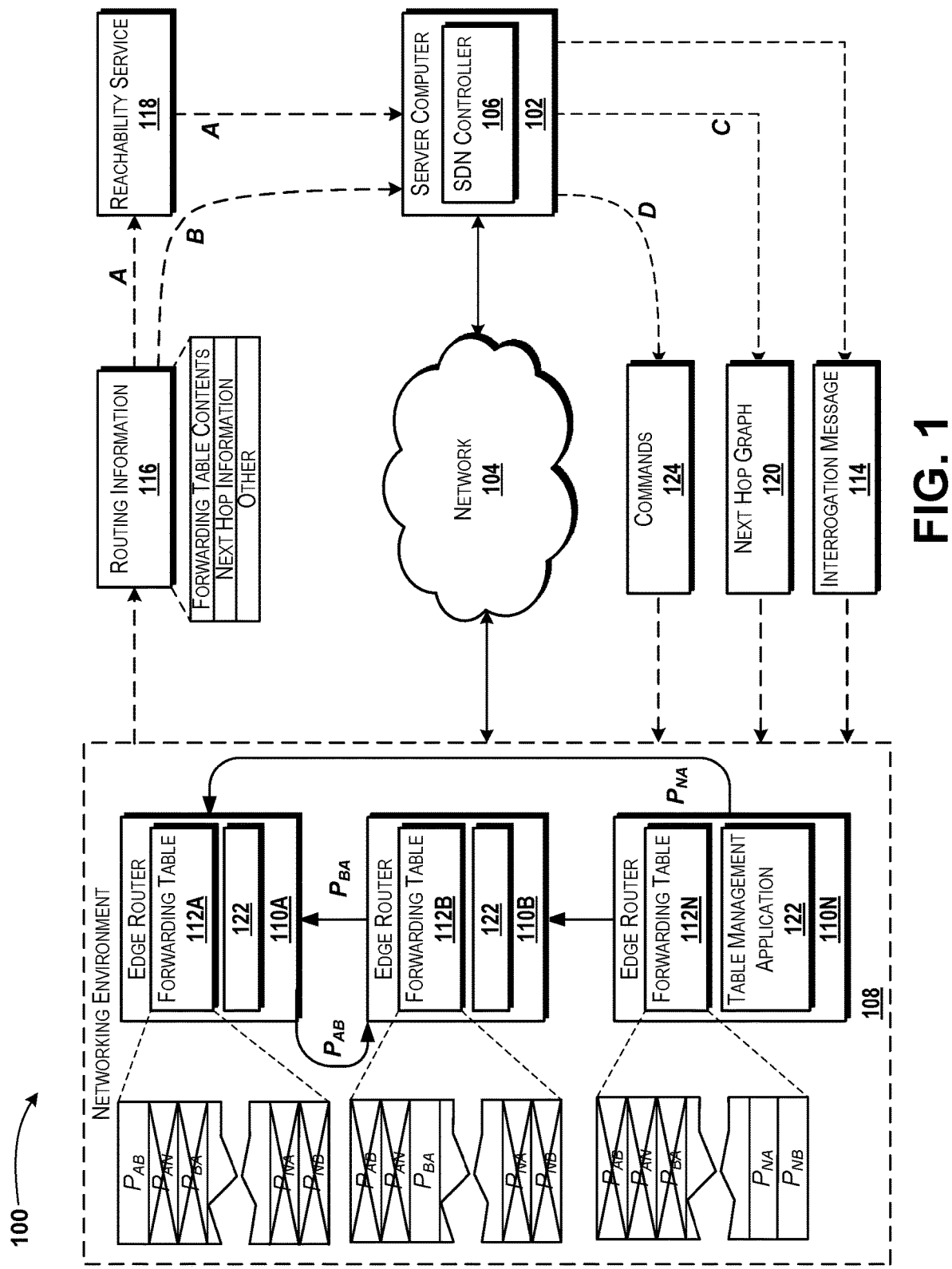
FIG. 1 is a system diagram illustrating an illustrative operating environment for various embodiments of the concepts and technologies described herein.

The following detailed description is directed to management of forwarding tables at edge routers. An SDN controller and/or other functionality can be executed or hosted by a server computer. The server computer that executes the SDN controller can interact with one more devices within a networking environment. In some embodiments, the server computer can be a part of the networking environment, though this is not necessarily the case. The server computer can receive or otherwise obtain routing information from one or more edge routers and/or from other devices associated with the networking environment that can include and/or be associated with the edge routers. The routing information can include forwarding table contents for one or more forwarding tables associated with one or more of the edge routers. The routing information also can include next hop information for the edge routers. The next hop information can define devices or entities with which the edge routers communicate directly.

The server computer can analyze the routing information to determine the next hops for a particular edge router and to generate a next hop graph that can represent the next hops for that edge router. In some embodiments, the server computer can provide the next hop graph to the edge router and/or the networking environment for providing to the edge router. The edge router can update the forwarding table associated with the edge router based on the next hop graph. In some other embodiments, the server computer can directly update the forwarding table associated with the edge router via commands and/or via direct control of the edge router or direct access to the forwarding table. In yet other embodiments, the server computer can broadcast the next hop graph or commands to one or more of the edge routers, and the edge routers can update the forwarding tables associated with the edge routers. Thus, the server computer can update the forwarding tables associated with one, more than one, and/or all edge routers associated with a networking environment. As such, it should be understood that that the analysis and next hop graph generation operations can be repeated for more than one and/or all edge routers in a networking environment.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for management of forwarding tables at edge routers will be described, according to an illustrative embodiment. The operating environment 100 shown in FIG. 1 includes a server computer 102. The server computer 102 can operate in communication with and/or as part of a communications network ("network") 104, though this is not necessarily the case. The network 104 will be illustrated and described in more detail below with reference to FIG. 5.

According to various embodiments, the functionality of the server computer 102 may be provided by one or more servers, desktop computers, mobile telephones, laptop computers, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer that has a processor and a memory that stores computer-executable instructions. It should be understood that this embodiment is illustrative, and should not be construed as being limiting in any way.

The server computer 102 can execute an operating system (not shown in FIG. 1) and one or more application programs such as, for example, a software defined networking ("SDN") controller 106. The operating system can include a computer program for controlling the operation of the server computer 102. The SDN controller 106 can include an executable program configured to execute on top of the operating system to provide various types of functionality as illustrated and described herein for providing management of forwarding tables at edge routers, as well as performing other functions.

In particular, according to various embodiments of the concepts and technologies described herein, the SDN controller 106 can be configured to control various aspects of a networking environment 108. The networking environment 108 can include a local or wide area network, a data center, a server farm, a provider network, an intranet, and/or other sets of resources (e.g., server computers, storage devices, processing resources, network connections, and the like). According to various embodiments, the networking environment can include a provider network and/or a portion of a provider network that can include one or more provider edge routers ("edge routers") 110A-N (hereinafter collectively and/or generically referred to as "edge routers 110"). It should be understood that other types of routers and networks can benefit from the concepts and technologies described herein, and as such the illustrated example of the edge routers 110 should not be construed as being limiting in any way.

The edge routers 110 can be configured to communicate with other devices such as, for example, other edge routers 110. When the edge routers 110 initiate communications with other devices, the edge routers 110 (or applications or modules executing on the edge routers 110) can access a table that can list routes to particular destinations within (or outside of) the networking environment 108 and/or preferred routes to various devices. According to various embodiments of the concepts and technologies described herein, the tables can include references to next hops associated with particular destinations instead of listing routes. Thus, as shown in FIG. 1, the edge routers 110 also can store forwarding tables 112A-N (hereinafter collectively and/or generically referred to as "forwarding tables 112") that can store data identifying next hop information that can be used by the edge routers 110. While traditional forwarding tables are the same for each router on a network, the concepts and technologies described herein enable the edge routers 110 to store different forwarding tables 112, as will be explained in more detail below.

In particular, in the past each edge router 110 has stored a copy of a forwarding table 112, where each copy of the forwarding table 112 is identical for each edge router 110. Thus, in the example illustrated in FIG. 1, the three illustrated edge routers 110 in the past would store a forwarding table 112 that provides route information between each of the three edge routers 110 and/or in each direction. In particular, the forwarding table 112 loaded to each of the edge routers 110 can include the information shown below in TABLE 1.

TABLE 1

| Destination | Cost | Next Hop |
| --- | --- | --- |
| Edge Router 110A | Cost A | Gateway A |
| Edge Router 110B | Cost B | Gateway B |
| ... | ... | ... |
| Edge Router 110N | Cost N | Gateway N |

As can be seen from the above extremely simplified example of a forwarding table 112, some data entries in the forwarding tables 112 stored by the edge routers 110 may be superfluous. Referring to the example shown in FIG. 1, the edge router 110A only sends communications to the edge router 110B along a communication path $P_{ab}$. The edge router 110B only sends communications to the edge router 110A along a communication path $P_{ba}$. The edge router 110N sends communications to both edge routers 110A, 110B along communication paths $P_{na}$, $P_{nb}$. In the past, however, the forwarding tables 112 stored by the edge routers 110 would include data for routing packets to each of the edge routers 110. Thus, the edge router 110A would, in the past, store a forwarding table 112 having at least three entries or perhaps even six entries corresponding to paths between each of the three edge routers 110 in both directions, when in fact only a single path is actually used by the edge router 110A.

Various embodiments of the concepts and technologies described herein provide for management of the forwarding tables 112 stored by the edge routers 110. In particular, each of the edge routers 110 can, via the concepts and technologies described herein, store a customized forwarding table 112 that is tailored to that edge router 110. Thus, the size of the forwarding tables 112 stored by the edge routers 110 can be reduced, thereby improving performance of the edge routers 110 (e.g., the time to perform data lookups in the forwarding tables 112 can be reduced) and/or reducing operating costs associated with the edge routers 110 (e.g., by enabling reduction of data storage requirements and/or processing costs). It should be understood that these examples are illustrative and therefore should not be construed as being limiting in any way.

According to some embodiments of the concepts and technologies described herein, the SDN controller 106 can interrogate the edge routers 110 and/or other devices associated with the networking environment 108 to obtain information associated with the edge routers 110 and/or the networking environment 108. According to various embodiments, the SDN controller 106 can interrogate the edge routers 110 and/or other devices associated with the networking environment 108 via an interrogation message 114. The SDN controller 106 can send the interrogation message 114 to one or more of the edge routers 110 or other devices. In some other embodiments, the SDN controller 106 can be configured to broadcast the interrogation message 114 to the edge routers 110 and/or other devices associated with the networking environment 108. In one contemplated embodiment, the SDN controller 106 can broadcast the interrogation message 114 as a broadcast group delay ("BGD") message. It should be understood that this example is illustrative and therefore should not be construed as being limiting in any way.

In response to the interrogation message 114, the edge routers 110 and/or other devices associated with the networking environment 108 (e.g., a reporting device, a network monitor, or the like) can generate routing information 116. The routing information 116 can be used by the SDN controller 106 to determine how the forwarding tables 112 should be updated, as will be explained in more detail below. In yet other embodiments, the edge routers 110 and/or other devices associated with the networking environment 108 can be configured to periodically advertise the routing information 116 without the interrogation message 114. The routing information 116 can be analyzed by the SDN controller 106 to determine if one or more of the forwarding tables 112 should be updated, as will be explained in more detail below. The routing information 116 can include forwarding table contents, next hop information, and/or other information, each of which is explained in more detail below.

The forwarding table contents can describe contents of a forwarding table 112 of a particular edge router 110. Thus, the forwarding table contents can indicate, for example, contents of the forwarding table 112A and that this forwarding table 112A is stored by the edge router 110A; contents of the forwarding table 112B and that this forwarding table 112B is stored by the edge router 110B; contents of the forwarding table 112N and that this forwarding table 112N is stored by the edge router 110N; contents of other forwarding tables 112 (not shown in FIG. 1) and/or their association with other edge routers 110 (not shown in FIG. 1). Thus, it can be appreciated that the routing information 116 can indicate forwarding table contents for one or more forwarding tables 112 associated with one or more of the edge routers 110.

In some other embodiments, where a particular edge router 110 may generate the routing information 116 in response to an interrogation message 114 or other command, the routing information 116 may only include forwarding table contents for that particular edge router 110, and as such, the routing information 116 may not include data or information associating those forwarding table contents with a particular edge router 110. It also can be appreciated that the routing information 116 can include a full or partial copy of a particular forwarding table 112, a reference or link to a particular forwarding table 112 or a copy thereof, and/or otherwise indicate the contents of the forwarding tables 112 and/or indicate the contents by reference. Thus, as will be explained in more detail below, the SDN controller 106 can analyze the routing information 116 to determine contents of a forwarding table 112 associated with a particular edge router 110. It should be understood that this example is illustrative and therefore should not be construed as being limiting in any way.

The next hop information can indicate one, more than one, and/or all next hops associated with a particular edge router 110. Thus, the next hop information can reflect some details of communication paths used by the edge router 110 to communicate. The next hop information can indicate, for a particular edge router 110, every device with which that edge router 110 communicates directly (e.g., a next hop) or define a route used by the edge router 110, wherein the route can list hops (and therefore a next hop can be determined from the route).

Embodiments of the concepts and technologies described herein can use next hop information for a particular edge router 110 to determine what communication paths or, more particularly, next hops, are actually used (and therefore needed) by the edge router 110. As will be explained in more detail below, by obtaining the forwarding table contents and next hop information for one or more edge routers 110, the SDN controller 106 can modify or command other entities to modify the forwarding tables 112 to only reflect routes and/or next hops for devices with which a particular edge router 110 communicates directly (e.g., via a next hop).

These and other aspects of the concepts and technologies described herein will be illustrated and described in more detail below.

The other information can include various types of information including, but not limited to, information that can be used to associate next hop information with a particular edge router 110; information that can be used to associate forwarding table contents with a particular forwarding table 112 or edge router 110; location information; combinations thereof; or the like. The other information also can indicate ownership of the edge routers 110, pending or expected updates to the edge routers 110 and/or communications that occur via the edge routers 110 (e.g., if there are any expected changes to the next hop information), or the like. The other information also can include acknowledgements and/or responses to commands or messages such as, for example, a response to an interrogation message 114, a communication indicating that a forwarding table 112 has been updated, copies of one or more forwarding tables 112, combinations thereof, or the like. Because the other information can include other types of information used by the SDN controller 106 to make changes to forwarding tables 112, it should be understood that these examples are illustrative and therefore should not be construed as being limiting in any way.

According to various embodiments of the concepts and technologies described herein, the routing information 116 can be sent by the edge routers 110 and/or other devices on associated with the networking environment 108 to a reachability service 118. The reachability service 118 can be configured to obtain the routing information 116 from the edge routers 110 and/or other devices on or associated with the networking environment 108 at various times. The reachability service 118 can, in some embodiments, categorize and/or summarize the routing information 116. Thus, for example, the reachability service 118 can generate a table or list that indicates next hops for one or more of the edge routers 110. In some other embodiments, the reachability service 118 may not modify the routing information 116 in any way and therefore may simply forward the routing information 116 to the SDN controller 106. Thus, the routing information can be provided to the SDN controller 106 via a first path A, in some embodiments.

In some other embodiments, the edge routers 110 and/or other devices on or associated with the networking environment 108 can provide the routing information 116 directly to the SDN controller 106 (and/or the server computer 102). Thus, as illustrated in FIG. 1, the edge routers 110 and/or other devices on associated with the networking environment 108 can provide the routing information 116 to the SDN controller 106 via a second path B. In yet other embodiments, as mentioned above, the edge routers 110 and/or other devices on associated with the networking environment 108 can broadcast the routing information 116 (or a portion thereof) and the broadcast information can be routed to the SDN controller 106 via various networking entities. Because the edge routers 110 and/or other devices on associated with the networking environment 108 can provide the routing information 116 to the SDN controller 106 via other paths and/or via other devices, it should be understood that the above-described and illustrated examples are illustrative and therefore should not be construed as being limiting in any way.

The SDN controller 106 can obtain the routing information 116 and analyze the routing information 116. According to various embodiments, the SDN controller 106 can select or otherwise identify an edge router 110 or forwarding table 112 to analyze. The determination as to which edge router 110 and/or which forwarding table 112 to analyze can be based upon various criteria such as, for example, selecting the edge router 110 having a lowest available processing and/or storage capacity (e.g., in an attempt to free processing and/or storage resources of heavily utilized edge routers 110); an edge router 110 having a lowest utilization of the edge routers 110 (based on an assumption that an edge router 110 having a lowest utilization may handle relatively few communications); a randomly selected edge router 110; combinations thereof; or the like.

The SDN controller 106 can analyze the routing information 116 to determine all next hops for the edge router 110 being analyzed. Thus, the SDN controller 106 can obtain the next hop information from the routing information 116 and determine all next hops associated with the edge router 110. Thus, the SDN controller 106 can, by analyzing the routing information 116, determine all next hops for the edge router 110. In accordance with various embodiments of the concepts and technologies described herein, the SDN controller 106 can also determine, by analyzing the routing information 116, contents of the forwarding table 112 associated with the edge router 110 being analyzed. Thus, embodiments of the concepts and technologies described herein allow the SDN controller 106 to determine what next hops are reflected by the forwarding table 112 associated with the edge router 110 being analyzed, and what next hops should be stored in the forwarding table 112.

Thus, embodiments of the concepts and technologies described herein also include the SDN controller 106 determining if changes should be made to the forwarding table 112. Thus, for example, if the SDN controller 106 analyzes the forwarding table 112A associated with the edge router 110A, the SDN controller 106 may determine that only the next hop associated with the communication path $P_{AB}$ should be reflected in the forwarding table 112A because the edge router 110A only communicates directly with the edge router 110B. Thus, the SDN controller 106 can determine that any other next hops stored in the forwarding table 112A should be removed as schematically illustrated in FIG. 1 by other next hops in the forwarding table 112A being struck through. It should be understood that this example is illustrative and therefore should not be construed as being limiting in any way.

The SDN controller 106 also can generate a next hop graph 120. The next hop graph 120 can include a graph, list, or other data structure that can indicate all next hops that should be reflected in the forwarding table 112 for the edge router 110 being analyzed. Thus, in the above example of the edge router 110A, the next hop graph 120 can indicate that only the next hop associated with the path $P_{AB}$ should be reflected in the forwarding table 112A. The SDN controller 106 can forward the next hop graph 120 toward the edge router 110 that was analyzed to effect updating of the associated forwarding table 112. In some embodiments, the SDN controller 106 can forward the next hop graph 120 directly to the edge router 110 that was analyzed. Thus, the next hop graph 120 can be sent to the edge router 110 and/or the networking environment via the path C shown in FIG. 1. It should be understood that this example is illustrative and therefore should not be construed as being limiting in any way.

According to various embodiments, the edge routers 110 can host and/or execute a table management application 122. The table management application 122 can be configured to recognize receipt of the next hop graph 120 and apply changes indicated by the next hop graph 120 to the forwarding table 112 stored at the edge router 110. Thus, for example, the table management application 122 can analyze the next hop graph 120 to determine what next hops are to be included in the forwarding table 112, and can remove unneeded and/or unwanted next hops from the forwarding table 112. Thus, the table management application 122 can update the forwarding table 112. Because other applications can update the forwarding tables 112, and because the forwarding tables 112 can be updated in other ways as illustrated and described herein, it should be understood that this example of updating the forwarding tables 112 is illustrative and therefore should not be construed as being limiting in any way.

In yet other embodiments, the SDN controller 106 can be configured to directly update the forwarding table 112 associated with the edge router 110 being analyzed. Thus, the SDN controller 106 may not forward the next hop graph 120 to the edge router 110 and/or the networking environment 108 in some embodiments. Rather, the SDN controller 106 can generate one or more commands 124 to modify the forwarding table 112 associated with the edge router 110 being analyzed and/or otherwise control the edge router 110 to update the forwarding table 112. Thus, the SDN controller 106 can update the forwarding table 112 by communications (e.g., commands) via the path D shown in FIG. 1, in some embodiments. Because the SDN controller 106 can effect updating of the forwarding tables 112 in additional and/or alternative manners and/or via additional and/or alternative paths, it should be understood that these examples are illustrative and therefore should not be construed as being limiting in any way.

In still other embodiments, the SDN controller 106 can broadcast the next hop graph 120 and/or the commands 124 to the edge routers 110 and/or the networking environment 108. In some contemplated embodiments, the next hop graph 120 and/or the commands 124 can be broadcast as a BGD message. In some of these embodiments, the commands 124 can update the forwarding tables 112 and/or the edge routers 110 can use the commands 124 and/or the next hop graph 120 to update the forwarding tables 112 (e.g., using the table management application 122). Because the forwarding tables 112 can be updated in additional and/or alternative ways, these examples should not be construed as being limiting in any way.

In practice, the SDN controller 106 and/or other functionality can be executed or hosted by the server computer 102. The server computer 102 can receive or otherwise obtain routing information 116 from one or more edge routers 110 and/or from other devices associated with a networking environment 108 that can include and/or be associated with the edge routers 110. The routing information 116 can include forwarding table contents for one or more forwarding tables 112 of the one or more edge routers 110. The routing information 116 also can include next hop information for the one or more edge routers 110 and other information as explained above.

The server computer 102 can analyze the routing information 116 to determine the next hops for a particular edge router 110 and generate a next hop graph 120 that represents the next hops for that edge router 110. In some embodiments, the server computer 102 can provide the next hop graph 120 to the edge router 110 and/or the networking environment 108. The edge router 110 can update the forwarding table 112 associated with the edge router 110 based on the next hop graph 120. In some other embodiments, the server computer 102 can directly update the forwarding table 112 associated with the edge router 110. In yet other embodiments, the server computer 102 can broadcast the next hop graph 120 to one or more of the edge routers 110. The broadcast next hop graph 120 can cause the edge routers 110 to update forwarding tables 112 associated with the edge routers 110. Thus, the server computer 102 can update the forwarding tables 112 associated with one, more than one, and/or all edge routers 110 associated with a networking environment 108.

In some embodiments, updating the forwarding tables 112 as illustrated and described herein can improve performance of the edge routers 110. For example, updating the forwarding tables 112 can result in decreased latency at the edge routers 110 by shortening the amount of time needed to identify a next hop and/or to obtain next hop information from a forwarding table 112. Updating the forwarding tables 112 also can reduce the costs of operating the edge routers 110 by reducing, for example, an amount of processing power and/or storage capacity needed to store and/or use the forwarding tables 112. Thus, the capacities of edge routers 110 can be reduced and/or the need to add new or redundant resources may be reduced. Because the updating of the forwarding tables 112 can result in other improvements, it should be understood that these examples are illustrative and therefore should not be construed as being limiting in any way.

FIG. 1 illustrates one server computer 102, one network 104, one networking environment 108, and three edge routers 110. It should be understood, however, that various implementations of the operating environment 100 can include zero, one, or more than one server computer 102; zero, one, or more than one network 104; one or more than one networking environment 108; and zero, one, two, three, or more than three edge routers 110. As such, the illustrated embodiment should be understood as being illustrative, and should not be construed as being limiting in any way.

Figure 2:
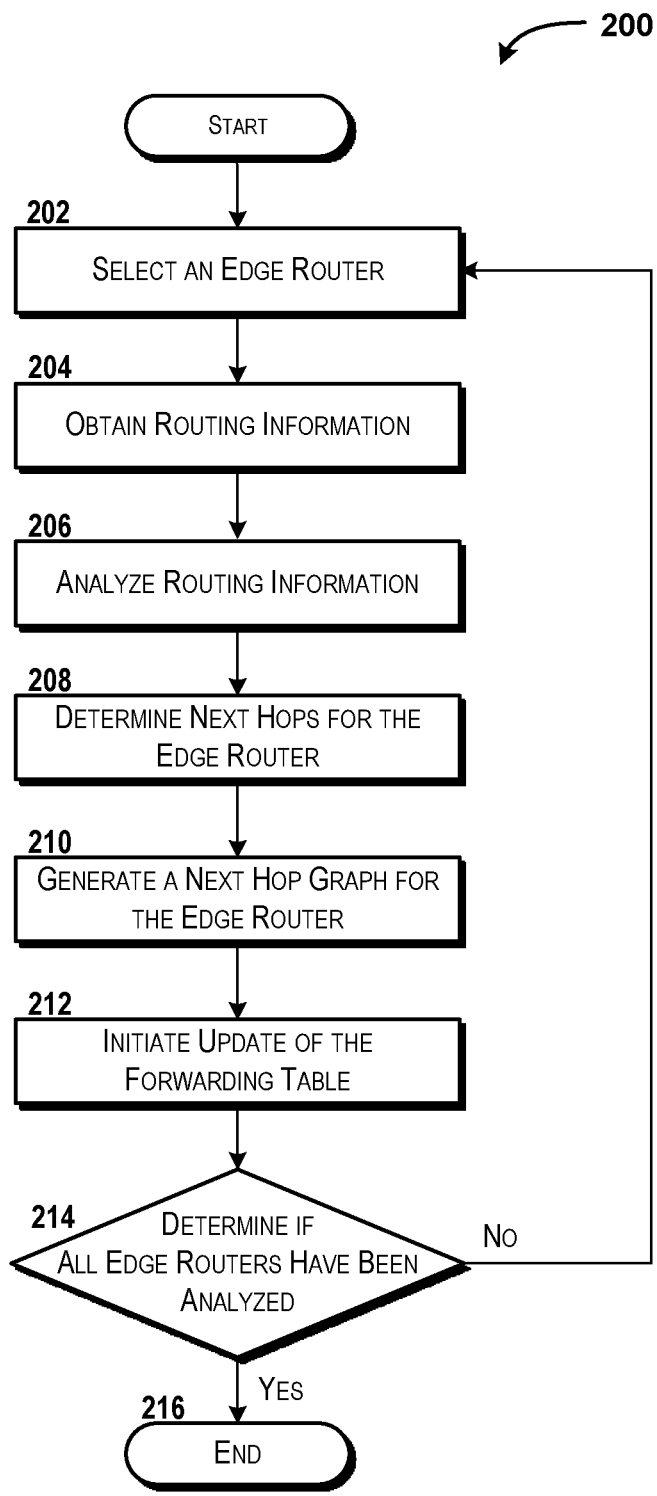
FIG. 2 is a flow diagram showing aspects of a method for updating forwarding tables at edge routers, according to an illustrative embodiment of the concepts and technologies described herein.

Turning now to FIG. 2, aspects of a method 200 for updating forwarding tables 112 associated with edge routers 110 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 and/or an edge router 110 to perform one or more operations and/or causing the processor to direct other components of the computing system or device to perform one or more of the operations.

For purposes of illustrating and describing the concepts of the present disclosure, the methods disclosed herein are described as being performed by the server computer 102 or an edge router 110 via execution of one or more software modules such as, for example, the SDN controller 106 and/or the table management application 122. It should be understood that additional and/or alternative devices and/or network nodes can provide the functionality described herein via execution of one or more modules, applications, and/or other software including, but not limited to, the SDN controller 106 and/or the table management application 122. Thus, the illustrated embodiments are illustrative, and should not be viewed as being limiting in any way.

The method 200 begins at operation 202. At operation 202, the server computer 102 can select an edge router 110. The server computer 102 can select the edge router 110 in operation 202 to analyze for purposes of verifying and/or modifying a forwarding table 112 associated with the edge router 110. It should be understood that the edge router 110 selected in operation 202 can be selected based on any desired criteria.

In some embodiments, for example, the server computer 102 can select the edge router 110 for analysis randomly. In some other embodiments, the server computer 102 may select an edge router 110 based upon a utilization of the edge router 110. For example, a highly utilized (relative to other edge routers 110) edge router 110 may be nearing its capacity and as such, the edge router 110 can be selected for analysis first in an attempt to avoid the need to add new edge routers 110, to modify capabilities of the edge router 110, or the like.

In another example, the edge router 110 can be selected by the server computer 102 based upon a low utilization (relative to other edge routers 110) as a low-utilization edge router 110 may be involved in relatively few communications and therefore may be storing a forwarding table 112 with a great deal of superfluous information. Because the edge router 110 can be selected in additional and/or alternative manners, it should be understood that these examples are illustrative and therefore should not be construed as being limiting in any way.

From operation 202, the method 200 can proceed to operation 204. At operation 204, the server computer 102 can obtain routing information. According to various embodiments of the concepts and technologies described herein, the routing information obtained in operation 204 can be similar or even identical to the routing information 116 illustrated and described herein with reference to FIG. 1, although this is not necessarily the case. For purposes of illustrating and describing the concepts and technologies described herein, the methods will be described with reference to the routing information 116. It should be understood that these examples are illustrative and therefore should not be construed as being limiting in any way.

According to various embodiments, as illustrated and described hereinabove with reference to FIG. 1, the routing information 116 obtained in operation 204 can be received directly from the edge router 110 selected in operation 202. Thus, although not shown in FIG. 2, it should be understood that the server computer 102 can send an interrogation message 114 to the edge router 110 selected in operation 202 and receive the routing information 116 in response to the interrogation message 114.

In some other embodiments, the routing information 116 received in operation 204 can be received from other devices or entities. For example, the routing information 116 can be received from one or more network monitors, from a reachability service 118, and/or other entities. The routing information 116 also can be broadcast or directly transmitted by one or more of the entities. Because the routing information 116 can be received in additional and/or alternative ways, it should be understood that these examples are illustrative and therefore should not be construed as being limiting in any way.

From operation 204, the method 200 can proceed to operation 206. At operation 206, the server computer 102 can analyze the routing information 116 obtained in operation 204. In operation 206, the server computer 102 can determine, based upon the analysis of the routing information 116, contents of a forwarding table 112 associated with the edge router 110 selected in operation 202 and next hops associated with the edge router 110. Thus, it can be appreciated that the server computer 102 can analyze the forwarding table contents, next hop information, and other information included in the routing information 116 in operation 206.

From operation 206, the method 200 can proceed to operation 208. At operation 208, the server computer 102 can determine one or more next hops for the edge router 110 selected in operation 202. Based on the analysis of the routing information 116, the server computer 102 can determine one, more than one, and/or all next hops associated with the edge router 110. According to various embodiments of the concepts and technologies described herein, the server computer 102 can determine all of the next hops associated with the edge router 110 in operation 208. Thus, the server computer 102 can determine each entity that is communicated with directly by the edge router 110 and/or what communication paths are used by the edge router 110. Because the next hops can be determined in additional and/or alternative ways (e.g., by receiving next hop data from a network monitor, the reachability server 118, or in other manners), it should be understood that this example is illustrative and therefore should not be construed as being limiting in any way.

It can be appreciated that regardless of what the end destination is for traffic from the edge router 110, the next hops can be determined by the server computer 102 in operation 208 based on the routing information 116 and/or other information. Thus, the server computer 102 does not merely determine what entities are communicated with by the edge router 110 selected in operation 202. Rather, the server computer 102 can determine what entities are communicated with directly by the edge router 110 and/or what next hops are associated with the edge router 110 selected in operation 202. It should be understood that this example is illustrative and therefore should not be construed as being limiting in any way.

From operation 208, the method 200 can proceed to operation 210. At operation 210, the server computer 102 can generate a next hop graph 120 for the edge router 110. The next hop graph 120 can include a list, table, or other data structure that can indicate each next hop determined in operation 208. The next hop graph 120 can indicate next hops used by the edge router 110 or can otherwise identify entities with which the edge router 110 communicates directly. Regardless of the exact format of the next hop graph 120, the next hop graph 120 can include data that indicates only the next hops used by the edge router 110 selected in operation 202.

From operation 210, the method can proceed to operation 212. At operation 212, the server computer 102 can initiate updating of the forwarding table 112 associated with the edge router 110 selected in operation 202. According to various embodiments, the server computer 102 can provide the next hop graph 120 generated in operation 210 to the edge router 110 selected in operation 202. The edge router 110 selected in operation 202 can receive the next hop graph 120 and update the forwarding table 112 based upon the contents of the next hop graph 120. As shown in FIG. 1, the edge router 110 can execute a table management application 122 to effect updating of the forwarding table 112 in some embodiments, though this is not necessarily the case.

According to some other embodiments, the server computer 102 can use the next hop graph 120 generated in operation 210 to update the forwarding table 112 directly. As explained above, the server computer 102 can be configured to access the forwarding tables 112 and can make changes to the forwarding tables 112, in some embodiments. Thus, operation 212 can include generating and/or transmitting commands 124 to cause the edge routers 110 or other entities associated with the networking environment 108 to update the forwarding tables 112, updating the forwarding tables 112 directly, and/or prompting other entities to update the forwarding tables 112.

In yet other embodiments, the server computer 102 can broadcast commands 124 and/or the next hop graph 120. The broadcast commands 124 and/or the next hop graph 120 can be received by the edge routers 110 and/or other entities or devices associated with the networking environment 108. The broadcast commands 124 and/or the next hop graph 120 can be used by the edge routers 110 or other entities to update the forwarding tables 112 as illustrated and described herein.

From operation 212, the method can proceed to operation 214. At operation 214, the server computer 102 can determine if all edge routers 110 associated with a networking environment 108, represented by the routing information 116, and/or otherwise determined to be analyzed have been analyzed have been analyzed. If the server computer 102 determines, in operation 214, that all of the edge routers 110 associated with a networking environment 108, represented by the routing information 116, and/or otherwise determined to be analyzed have been analyzed have not been analyzed, the method 200 can return to operation 202 and the server computer 102 can select another edge router 110 for analysis. Thus, it can be appreciated that operations 202-214 can be repeated until the server computer 102 determines, in any iteration of operation 214, that all edge routers 110 associated with a networking environment 108, represented by the routing information 116, and/or otherwise determined to be analyzed have been analyzed.

If the server computer 102 determines, in operation 214, that all of the edge routers 110 associated with a networking environment 108, represented by the routing information 116, and/or otherwise determined to be analyzed have been analyzed, the method 200 can return proceed to operation 216. The method 200 can end at operation 216. Thus, by performing the method 200, the server computer 102 can update the forwarding table 112 associated with one or more edge routers 110 or cause other entities to update the forwarding tables 112.

Figure 3:
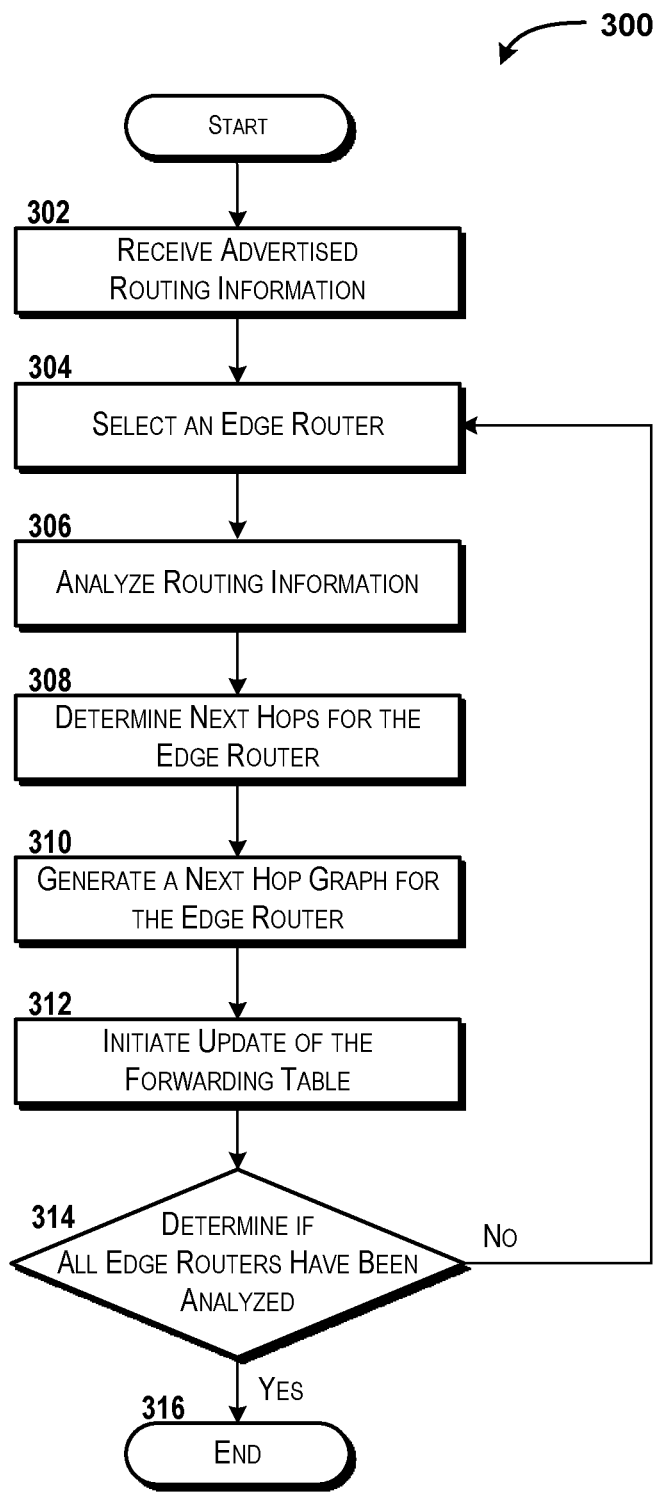
FIG. 3 is a flow diagram showing aspects of another method for updating forwarding tables at edge routers, according to an illustrative embodiment of the concepts and technologies described herein.

Turning now to FIG. 3, aspects of another method 300 for updating forwarding tables 112 associated with edge routers 110 will be described in detail, according to an illustrative embodiment. The method 300 begins at operation 302. At operation 302, the server computer 102 can receive advertised routing information. In some embodiments, the routing information received in operation 302 can be similar or even identical to the routing information 116 illustrated and described above with reference to FIG. 1. Thus, it can be appreciated that the routing information 116 received in operation 302 can include forwarding table contents, next hop information, and other information. As explained with reference to FIG. 2, the method 300 is illustrated and described with reference to the routing information 116 for purposes of clarity. Because other types of routing information can be received in the method 300, it should be understood that this example is illustrative and therefore should not be construed as being limiting in any way.

The routing information 116 can be received as a direct transmission, in some embodiments, from the edge routers 110 or other entities associated with the networking environment 108. In some other embodiments, the routing information 116 can be sent as a broadcast message or as multiple broadcast messages by the edge routers 110 and/or other entities associated with the networking environment 116. The broadcast message(s) can be sent by one or more of the edge routers 110 or by other devices associated with the networking environment 108. In some embodiments, the routing information 116 can be broadcast as a BGD message. Because the message can be broadcast in other formats and/or according to other protocols, it should be understood that this example is illustrative and therefore should not be construed as being limiting in any way. Also, because the routing information received in operation 302 can be sent by one or more of the edge routers 110 (or on behalf of one or more edge routers 110), it should be understood that the routing information 116 may relate to more than one edge router 110.

From operation 302, the method 300 can proceed to operation 304. At operation 304, the server computer 102 can select an edge router 110 for analysis. The server computer 102 can select an edge router 110 associated with the routing information 116 received in operation 302. It can be appreciated that in some embodiments the server computer 102 can identify the edge router 110 based on the other information included in the routing information 116 which, as explained above with reference to FIG. 1, can be used to associate forwarding table contents and/or next hop information with an edge router 110, or provide other details relating to the edge routers 110.

In operation 304, therefore, the server computer can select one of the edge routers 110 represented by and/or associated with the routing information 116. As explained above with reference to operation 202 of FIG. 2, the edge router 110 can be selected for analysis based upon various criteria. For example, the server computer 102 can determine what edge routers 110 are represented by the routing information 116 and select one of those edge routers 110 anonymously. In some other embodiments, the server computer 102 can determine what edge routers 110 are represented by the routing information 116 and select one of those edge routers 110 based upon utilizations (high or low) associated with the edge routers 110. In yet other embodiments, the server computer 102 can determine what edge routers 110 are represented by the routing information 116 and select one of those edge routers 110 based upon additional and/or alternative criteria. Because the edge router 110 can be selected based upon any desired criteria, it should be understood that the above examples are illustrative and therefore should not be construed as being limiting in any way.

From operation 304, the method 300 can proceed to operation 306. At operation 306, the server computer 102 can analyze the routing information 116 obtained in operation 302. It can be appreciated that the server computer 102 can analyze a part of the routing information 116 that is associated with the edge router 110 selected in operation 304, or that the server computer 102 can analyze all of the routing information 116. The server computer 102 can determine, based upon the analysis of the routing information 116, contents of a forwarding table 112 associated with the edge router 110 selected in operation 304 and one, more than one, and/or all next hops associated with the edge router 110. Thus, it can be appreciated that the server computer 102 can analyze the forwarding table contents, next hop information, and other information included in the routing information 116 in operation 306.

From operation 306, the method 300 can proceed to operation 308. At operation 308, the server computer 102 can determine next hops for the edge router 110 selected in operation 304. As explained above, the server computer 102 can determine the next hops based on the analysis of the routing information 116 in various embodiments of the concepts and technologies described herein. In some other embodiments, however, the server computer 102 can receive other information from various other entities such as resource monitors, reporting mechanisms, network monitors, or the like. The method 300 is illustrated and described with reference to determining the next hops from the next hop information included in the routing information 116. It should be understood that this example is illustrative and therefore should not be construed as being limiting in any way.

The server computer 102 can determine one, more than one, and/or all next hops associated with the edge router 110. As such, the server computer 102 can determine each entity that is communicated with directly by the edge router 110 and/or what communication paths are used by the edge router 110. The server computer 102 can identify the next hops based upon these or other determinations.

It can be appreciated that the server computer 102 may ignore, in some instances, destinations associated with traffic from the edge router 110 and consider only what next hops are associated with the edge router 110. As such, as explained above with reference to FIGS. 1-2, in some embodiments the server computer 102 does not merely determine what entities are communicated with by the server computer 102. Rather, the server computer 102 can determine what entities are communicated with directly by the server computer 102. Because the next hops can be determined in other manners, it should be understood that this example is illustrative and therefore should not be construed as being limiting in any way.

From operation 308, the method 300 can proceed to operation 310. At operation 310, the server computer 102 can generate a next hop graph 120 based on the next hops determined in operation 308. As explained above, the next hop graph 120 can include a data structure that can indicate each next hop determined in operation 308. The next hop graph 120 can represent a list of next hops associated with the edge router 110 in any desired format such as lists of communication paths used by the edge router 110, lists of entities with which the edge router 110 communicates directly, routes or hops used by the edge router 110 (from which a first or next hop can be determined), combinations thereof, or the like. Regardless of the format of the next hop graph 120, the next hop graph 120 can include data that indicates only the next hops for the edge router 110.

From operation 310, the method 300 can proceed to operation 312. At operation 312, the server computer 102 can initiate updating of the forwarding table 112 associated with the edge router 110 that was selected in operation 304. As explained above, the server computer 102 can initiate the updating in a number of manners. In some embodiments, the server computer 102 can provide the next hop graph 120 generated in operation 310 to the edge router 110 selected in operation 304, and the edge router 110 can update the forwarding table 112 based upon the contents of the next hop graph 120.

According to some other embodiments, the server computer 102 can use the next hop graph 120 generated in operation 310 to update the forwarding table 112 directly. Thus, the server computer can generate and/or transmit commands 124 to update the forwarding tables 112 and/or to prompt other entities to update the forwarding tables 112. In still other embodiments, the server computer 102 can broadcast commands 124 and/or the next hop graph 120. The broadcast commands 124 and/or the next hop graph 120 can be received by the edge routers 110 and/or other entities or devices associated with the networking environment 108, and those devices or entities can used the broadcast commands 124 and/or the next hop graph 120 to update the forwarding tables 112 as illustrated and described herein. Because the updating can be initiated and/or effected in additional and/or alternative manners, it should be understood that these examples are illustrative and therefore should not be construed as being limiting in any way.

From operation 312, the method 300 can proceed to operation 314. At operation 314, the server computer 102 can determine if all edge routers 110 associated with a networking environment 108, represented by the routing information 116, and/or otherwise determined to be analyzed have been analyzed. If the server computer 102 determines, in operation 314, that all edge routers 110 associated with a networking environment 108, represented by the routing information 116, and/or otherwise determined to be analyzed have been analyzed have not been analyzed, the method 200 can return to operation 304, and the server computer 102 can select another edge router 110 for analysis.

Operations 304-314 can be repeated until the server computer 102 determines, in any iteration of operation 314, that all edge routers 110 associated with a networking environment 108, represented by the routing information 116, and/or otherwise determined to be analyzed have been analyzed. If the server computer 102 determines, in operation 314, that all edge routers 110 associated with a networking environment 108, represented by the routing information 116, and/or otherwise determined to be analyzed have been analyzed have been analyzed, the method 300 can proceed to operation 316. The method 300 can end at operation 316. Thus, it can be appreciated that by performing the method 300, the server computer 102 can update the forwarding table 112 associated with one or more edge routers 110 or cause other entities to update the forwarding tables 112.

Figure 4:
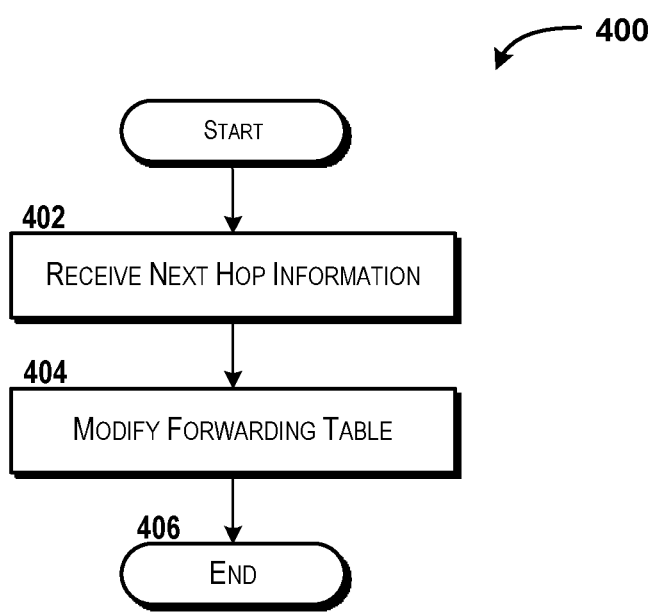
FIG. 4 is a flow diagram showing aspects of a method for applying updates to forwarding tables at edge routers, according to an illustrative embodiment of the concepts and technologies described herein.

Turning now to FIG. 4, aspects of a method 400 for applying updates to forwarding tables 112 at edge routers 110 will be described in detail, according to an illustrative embodiment. The method 400 begins at operation 402. At operation 402, the edge router 110 can receive information from the server computer 102. According to various embodiments, the information received in operation 402 can include a next hop graph 120 or a command 124. According to various embodiments, the edge router 110 can receive the next hop graph 120 from the server computer 102. As explained above, the edge router 110 can alternatively receive the command 124. The next hop graph 120 or the command 124 can be transmitted directly to the edge router 110 or broadcast by the server computer 102, as explained above. Regardless of how the next hop graph 120 or command 124 is transmitted, the next hop graph 120 or command 124 can be received in operation 402.

From operation 402, the method 400 can proceed to operation 404. At operation 404, the edge router 110 can modify a forwarding table 112. According to various embodiments, the edge router 110 can modify the forwarding table 112 by executing a table management application 122, which can use the information received in operation 402 to update the forwarding tables 112. In some other embodiments, the forwarding table 112 can be updated directly by a command 124 (which can be received as part of the information in operation 402) and/or by the server computer 102 directly.

The forwarding table 112 can be updated in a number of ways. In some embodiments, the forwarding table 112 can be updated by being replaced by a new forwarding table 112. Thus, the information received in operation 402 can correspond to a new forwarding table 112. Thus, operation 404 can include the previous version of the forwarding table 112 being replaced with a new version of the forwarding table 112. It should be understood that this example is illustrative and therefore should not be construed as being limiting in any way.

In some other embodiments, the forwarding table 112 can be updated by removing next hop information that is not included in the next hop graph 120 generated by the server computer 102. Thus, the forwarding table 112 can be updated to remove next hops that are not used by the edge routers 110. It should be understood that this example is illustrative and therefore should not be construed as being limiting in any way.

Regardless of how the updates to the forwarding table 112 are made, the forwarding table 112 stored by the edge router 110 can be updated to remove or at least reduce unnecessary information included in the forwarding table 112. Thus, the updating of the forwarding table 112 can reduce the size of the forwarding table 112. By reducing the size of the forwarding table 112, the concepts and technologies described herein can be used to reduce latency associated with the edge router 110 accessing next hop information in the forwarding table 112, reduce a necessary compute and/or storage capacity associated with the edge router 110 storing and/or using the forwarding table 112, and/or otherwise cut costs and/or improve performance of the edge router 110. Also, as noted above, by freeing resources being consumed by edge routers 110 for forwarding table 112 use and/or storage, the concepts and technologies described herein can cut costs associated with providing services via the networking environment and/or obviate the need to install new hardware in the networking environment 108.

From operation 404, the method 400 can proceed to operation 406. The method 400 can end at operation 406.

Figure 5:
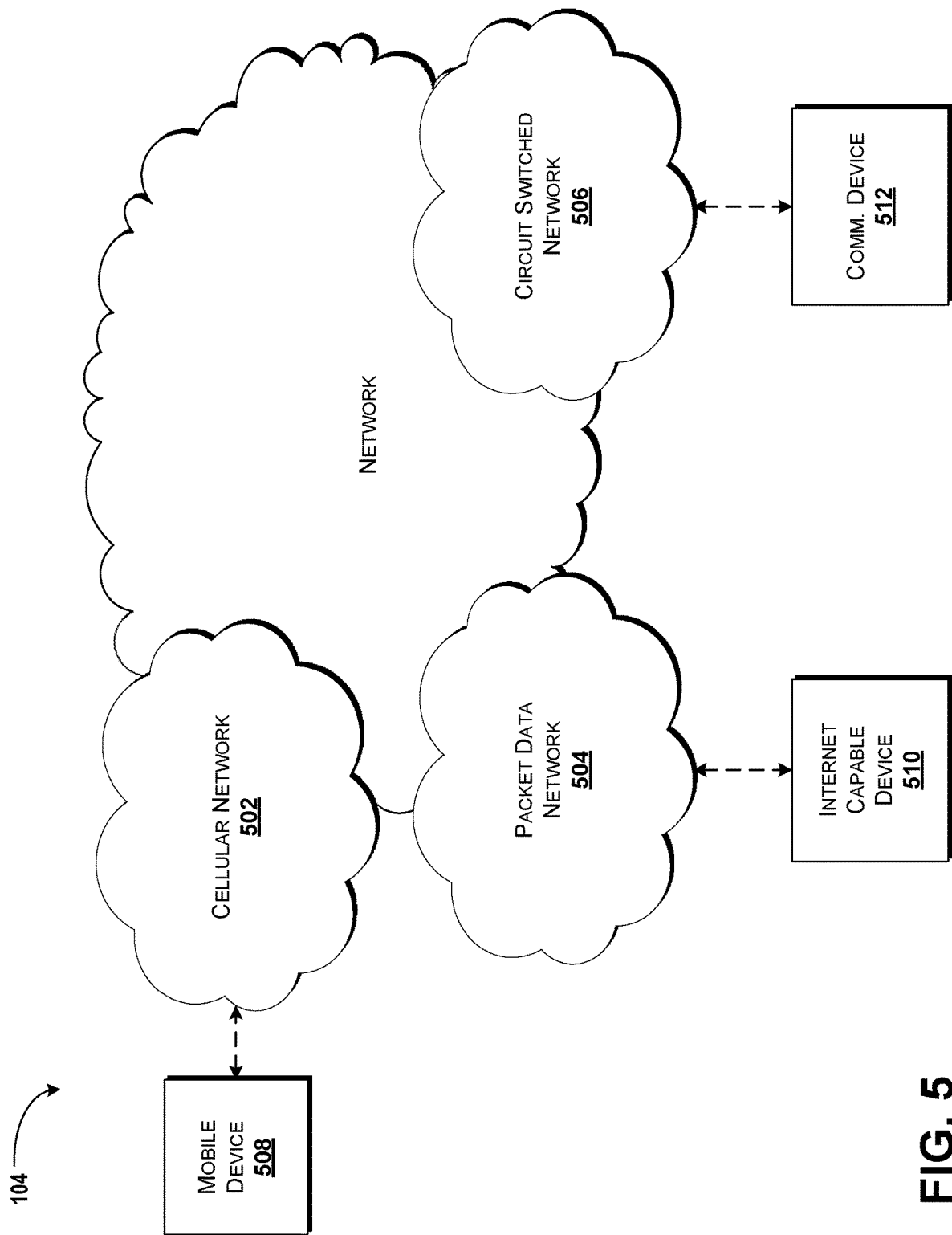
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
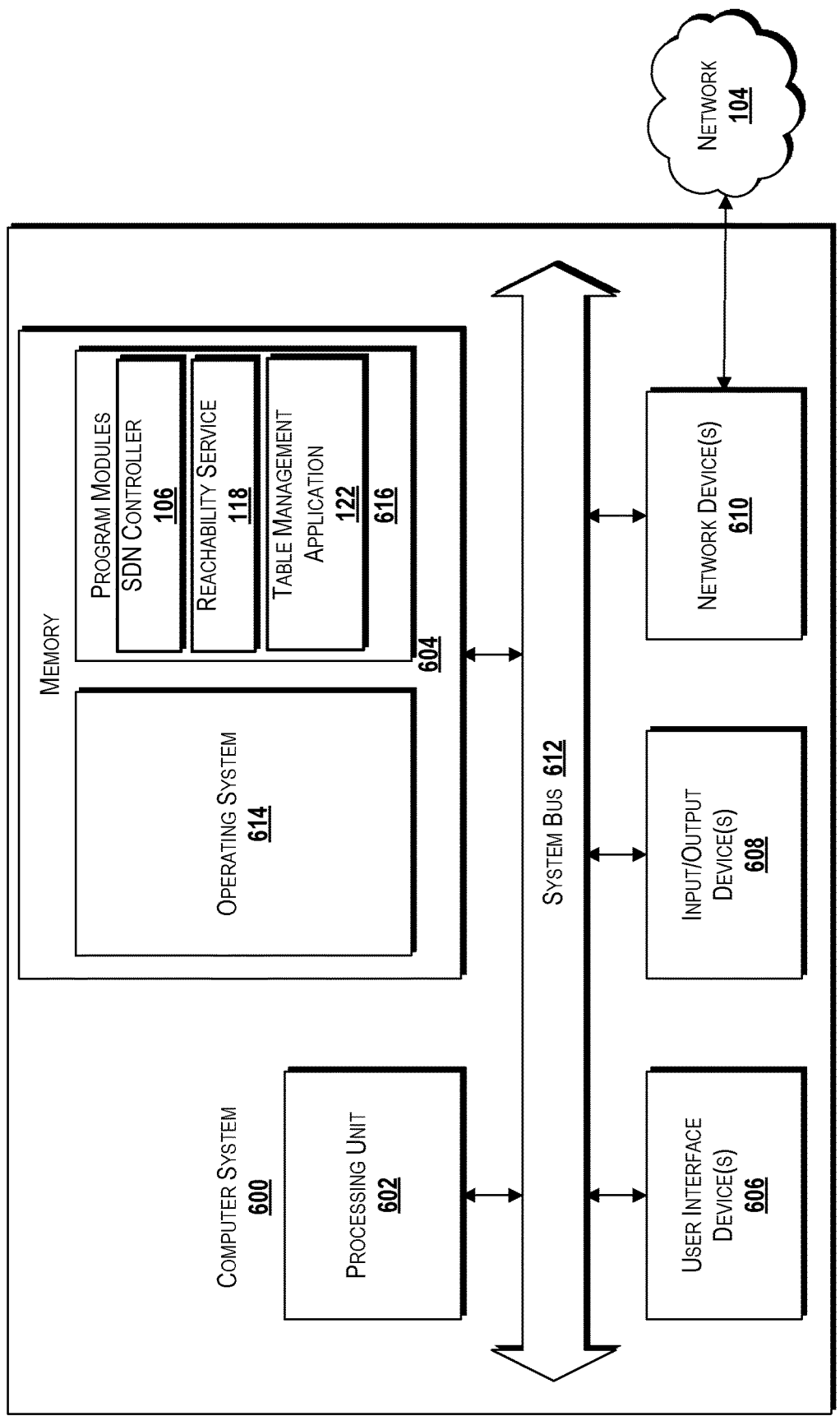
FIG. 6 is a block diagram illustrating an example computer system configured to provide management of forwarding tables at edge routers, according to some illustrative embodiments of the concepts and technologies described herein.

FIG. 6 is a block diagram illustrating a computer system 600 configured to provide the functionality described herein for providing management of forwarding tables 112 associated with edge routers 110, in accordance with various embodiments of the concepts and technologies disclosed herein. Thus, it can be appreciated that the computer system 600 can correspond to an architecture for the server computer 102, the edge router 110, and/or the reachability service 118, though this is not necessarily the case. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the SDN controller 106, the reachability service 118, and/or the table management application 122. These and/or other programs can be embodied in computer-readable media containing computer-executable instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the forwarding tables 112, the interrogation message 114, the routing information 116, the next hop graphs 120, the commands 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for management of forwarding tables at edge routers have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
obtaining, by a computer comprising a processor, a first version of a forwarding table that is stored by a first edge router associated with a networking environment, the networking environment comprising edge routers comprising the first edge router and a second edge router, wherein the first version of the forwarding table comprises a first entry that indicates a first device with which the first edge router directly communicates, and a second entry that indicates a second device with which the second edge router directly communicates, and wherein the second edge router stores the first version of the forwarding table;
obtaining, by the processor, a next hop graph that represents only next hops for the first edge router, each of the next hops comprising a device that is communicated with directly by the first edge router; and
initiating, by the processor, updating of the first version of the forwarding table by the first edge router, wherein the first edge router removes, based on the next hop graph, the second entry from the first version of the forwarding table to obtain a second version of the forwarding table, and wherein the first edge router stores the second version of the forwarding table.

2. The method of claim 1, wherein the processor generates the next hop graph based on next hop information for the networking environment, and wherein the next hop information indicates the next hops for the first edge router and further next hops for the second edge router.

3. The method of claim 1, further comprising:
sending, to the first edge router, a command that causes the first edge router to remove, from the first version of the forwarding table, entries that are not used by the first edge router.

4. The method of claim 1, further comprising:
receiving, via a broadcast message, routing information that indicates communication paths associated with the first edge router, wherein the routing information is generated by the first edge router.

5. The method of claim 1, wherein initiating the updating of the first version of the forwarding table comprises sending, directed to the first edge router, the next hop graph.

6. The method of claim 1, wherein initiating the updating of the first version of the forwarding table comprises:
broadcasting a command that causes the first edge router remove, from the first version of the forwarding table, entries that are not used by the first edge router.

7. The method of claim 1, wherein initiating updating of the first version of the forwarding table comprises:
instructing the first edge router to delete, from the first version of the forwarding table, entries that are not used by the first edge router.

8. The method of claim 1, further comprising:
sending an interrogation message to the first edge router to request routing information indicating communication paths used by the first edge router; and
receiving, in response to the interrogation message, the routing information.

9. The method of claim 1, further comprising:
receiving routing information from a reachability server associated with the networking environment, wherein the routing information indicates communication paths used by the first edge router.

10. A system comprising:
a processor; and
a memory that stores computer-executable instructions that, when executed by the processor, cause the processor to perform operations comprising
obtaining a first version of a forwarding table that is stored by a first edge router associated with a networking environment, the networking environment comprising edge routers comprising the first edge router and a second edge router, wherein the first version of the forwarding table comprises a first entry that indicates a first device with which the first edge router directly communicates, and a second entry that indicates a second device with which the second edge router directly communicates, and wherein the second edge router stores the first version of the forwarding table,
obtaining a next hop graph that represents only next hops for the first edge router, each of the next hops comprising a device that is communicated with directly by the first edge router, and
initiating sending of the next hop graph to the first edge router, wherein the first edge router removes the second entry from the first version of the forwarding table to obtain a second version of the forwarding table, and wherein the first edge router stores the second version of the forwarding table.

11. The system of claim 10, wherein the next hop graph is generated based on next hop information for the networking environment, and wherein the next hop information indicates the next hops for the first edge router and further next hops for the second edge router.

12. The system of claim 10, wherein the computer-executable instructions, when executed by the processor, cause the processor to perform operations further comprising:
sending, to the first edge router, a command that causes the first edge router to remove, from the first version of the forwarding table, entries that are not used by the first edge router.

13. The system of claim 10, wherein the computer-executable instructions, when executed by the processor, cause the processor to perform operations further comprising:
receiving, via a broadcast message, routing information that indicates communication paths associated with the first edge router, wherein the routing information is generated by the first edge router.

14. The system of claim 10, wherein initiating the updating of the forwarding table associated with the first edge router comprises:
broadcasting a command that causes the first edge router remove, from the first version of the forwarding table, entries that are not used by the first edge router.

15. The system of claim 10, wherein the computer-executable instructions, when executed by the processor, cause the processor to perform operations further comprising:
sending an interrogation message to the first edge router to request routing information indicating communication paths used by the first edge router; and
receiving, in response to the interrogation message, the routing information.

16. A computer storage medium having computer-executable instructions stored thereon that, when executed by a processor, cause the processor to perform operations comprising:
obtaining a first version of a forwarding table that is stored by a first edge router associated with a networking environment, the networking environment comprising edge routers comprising the first edge router and a second edge router, wherein the first version of the forwarding table comprises a first entry that indicates a first device with which the first edge router directly communicates, and a second entry that indicates a second device with which the second edge router directly communicates, and wherein the second edge router stores the first version of the forwarding table;
obtaining a next hop graph that represents only next hops for the first edge router, each of the next hops comprising a device that is communicated with directly by the first edge router; and
initiating sending of the next hop graph to the first edge router, wherein the first edge router removes the second entry from the first version of the forwarding table to obtain a second version of the forwarding table, and wherein the first edge router stores the second version of the forwarding table.

17. The computer storage medium of claim 16, wherein the next hop graph is generated based on next hop information for the networking environment, and wherein the next hop information indicates the next hops for the first edge router and further next hops for the second edge router.

18. The computer storage medium of claim 16, wherein the computer-executable instructions, when executed by the processor, cause the processor to perform operations further comprising:
sending, to the first edge router, a command that causes the first edge router to remove, from the first version of the forwarding table, entries that are not used by the first edge router.

19. The computer storage medium of claim 16, wherein the computer-executable instructions, when executed by the processor, cause the processor to perform operations further comprising:
receiving, via a broadcast message, routing information that indicates communication paths associated with the first edge router, wherein the routing information is generated by the first edge router, and wherein initiating the updating of the forwarding table comprises broadcasting a command that causes the first edge router to remove, from the forwarding table, entries that are not used by the first edge router.

20. The computer storage medium of claim 16, wherein the computer-executable instructions, when executed by the processor, cause the processor to perform operations further comprising:
sending an interrogation message to the first edge router to request routing information indicating communication paths used by the first edge router; and
receiving, in response to the interrogation message, the routing information.

* * * * *